United States Patent [19]
Corrado

[11] Patent Number: 5,860,674
[45] Date of Patent: Jan. 19, 1999

[54] AOS FAN MODULATION SYSTEMS

[75] Inventor: Anthony P. Corrado, Clarkston, Mich.

[73] Assignee: Robert Bosch Corporation, Farmington Hills, Mich.

[21] Appl. No.: 839,726

[22] Filed: Apr. 15, 1997

Related U.S. Application Data

[60] Provisional application No. 60/034,894 Jan. 31, 1997.

[51] Int. Cl.$^6$ .................................................. B60R 21/32
[52] U.S. Cl. ........................................... 280/735; 180/271
[58] Field of Search ................................... 280/735, 734; 307/10.1; 340/522; 180/271

[56] References Cited

U.S. PATENT DOCUMENTS

| | | | |
|---|---|---|---|
| 5,413,378 | 5/1995 | Steffens, Jr. et al. | 280/735 |
| 5,482,314 | 1/1996 | Corrado et al. | 280/735 |
| 5,653,462 | 8/1997 | Breed et al. | 280/735 |
| 5,785,347 | 7/1998 | Adolph et al. | 280/735 |

*Primary Examiner*—Christopher P. Ellis
*Attorney, Agent, or Firm*—Heller Ehrman White; White & McAuliffe; Jacques M. Dulin

[57] ABSTRACT

Modulation and cutoff system for automotive interior fans/blowers which cuts off fan or closes shutters to stop or divert airflow during preselected Automotive Occupancy Sensor system operations so that the airflow does not interfere with, cause anomalies or short duration signal ambiguities in the US and IR sensor signal detection. The US sensor increases to a fast mode cycle upon receiving a crash imminent (CI) signal or upon detection of a Keep-Out Zone Intrusion (KOZI). Upon receipt of a CI or KOZI signal the fan/blower power is interrupted, slowed or the airstream is diverted. Alternately or additionally, the AOS system can be recalibrated for fan or air stream relative movement, the before/after fan interrupt US/IR signals can be compared, and a "fan-on" signal can be used to change AOS fusion processing coefficient, feature selections or matrix.

8 Claims, 1 Drawing Sheet

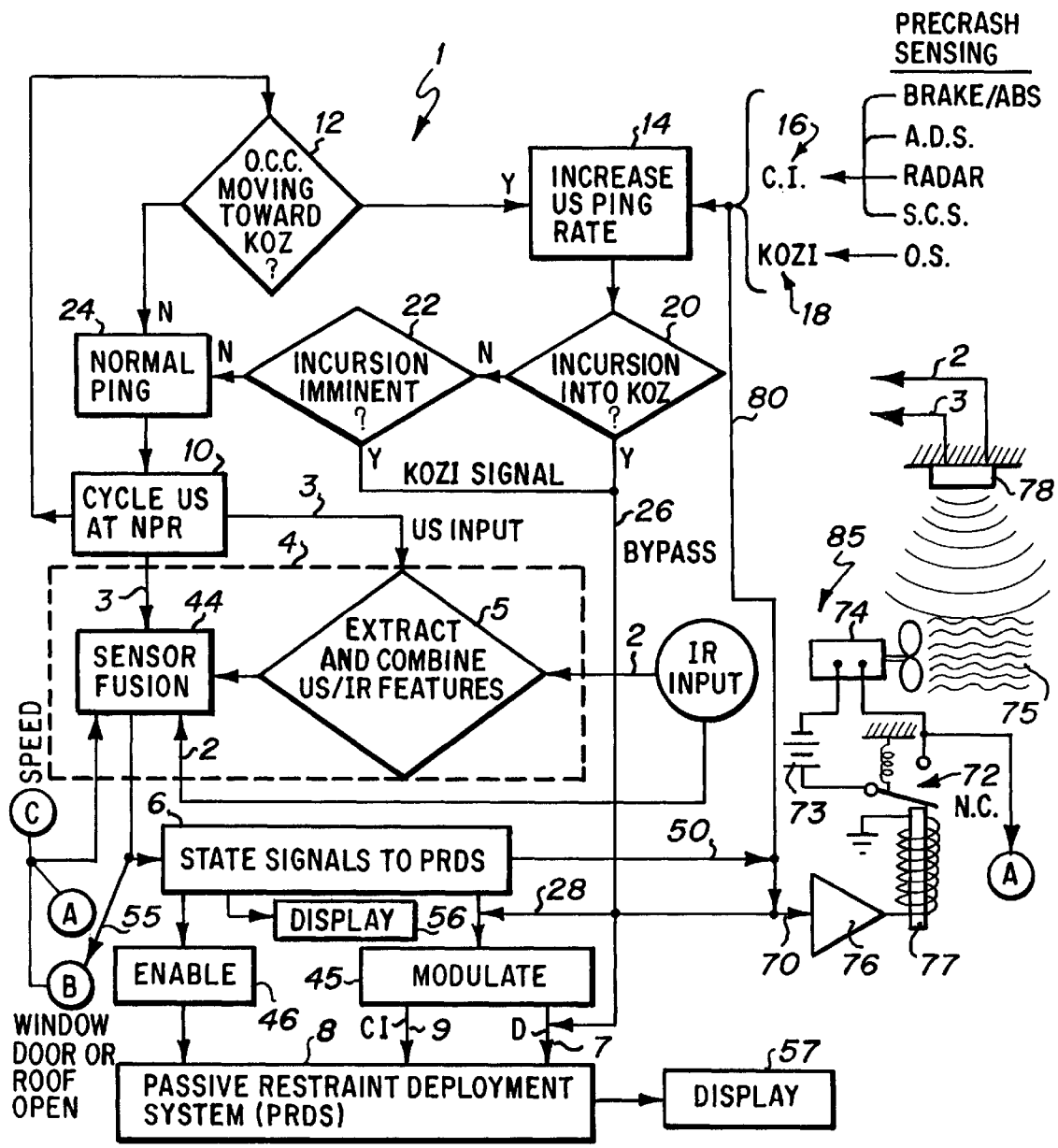

AOS FAN MODULATION SYSTEMS

CROSS-REFERENCE TO RELATED APPLICATIONS

This application discloses and claims as a regular application the subject matter disclosed in United States Provisional Application, Ser. No. 60/034,894, titled "AOS FAN MODULATION SYSTEMS", filed Jan. 31, 1997, by the inventor of this case, Anthony P. Corrado. Priority of the filing date of Jan. 31, 1997 is hereby claimed, and the disclosure of said Provisional Application is hereby incorporated by reference.

TECHNICAL FIELD

The invention relates to a fan modulation and cutoff system for automotive occupancy sensing (AOS) systems for sensing the nature or type of occupant and the location of the occupant with respect to the vehicle interior, and more specifically with respect to the occupant seat and dashboard or instrument panel (IP) to develop a signal useable by the airbag deployment system (ADS) by which the ADS can deploy or not (abort deployment), or modify deployment for dual phase airbags (DPA), multiphase airbags (MPA), or for partial or controlled rate inflation airbags (collectively herein termed "smart airbag systems" or "SAS").

BACKGROUND

For background on AOS systems see Corrado et al., U.S. Pat. No. 5,482,314 and our copending divisional case Ser. No. 08/731,355, filed Oct. 11, 1996. Such systems produce a signal for input to the ADS, which if the occupant is out of position (OOP) or in a rear facing infant seat (RFIS) in the front seat of a vehicle, the deployment of the airbag is aborted, deferred or otherwise controlled, as in SAS.

One of the substantive factors to be considered is the fact that air currents set up within the vehicle near the IP can interfere with or cause anomalous readings of ultrasound (US) sensors. In addition, streams of heated or cold conditioned air can interfere with or cause short duration signal ambiguities of Infra Red (IR) sensors. The former tends to be long term, i.e., US anomalies so long as blower is on, while the IR tends to be transient.

DISCLOSURE OF THE INVENTION

The invention comprises a system for cut-off of fans or blowers so that air streams do not interfere with signal sensing, signal fusion or probability analysis as set forth in my prior U.S. Pat. No. 5,482,314. The system employs ultrasound sensing to determine the intrusion, or imminence of intrusion, into a defined Keep Out Zone (KOZ) between the IP and the occupant seat. Typically, the Keep Out Zone is 6" to 12" deep (measured off of the face of the IP), and "intrusion" includes both actual presence in the zone or such approach toward the KOZ that entry is predictably imminent.

According to the process and apparatus of the invention, the ultrasound (US) sensor cycles approximately 2x/second (normal ping rate, NPR) in normal (non-crash) mode, and increases into a fast mode cycle rate, pinging on the order of every 10–20 milliseconds, i.e., 25 Hz rate, after receiving a "crash imminent" (CI) signal or upon detection of a KOZ Intrusion condition or state (KOZI). The "crash imminent" signal can be derived from a wide variety of sensors, such as but not limited to: the brake pedal being depressed upon a panic or abrupt stop for a road hazard or to avoid a collision; from the airbag deployment sensor; from the vehicle stabilizer control system (accelerometer and/or wheel and brake condition sensors) from a collision avoidance radar or other pre-crash sensing device; and/or from a variety of occupant sensors such as US, IR, optic, pressure or weight sensors (e.g., floor mat, seat or seat back, or seat belt), capacitance-type mass sensors, and the like.

Upon receipt of such CI or KOZI signal, whether the ultrasound ping rate is in regular or fast mode, a fan/blower power interrupt signal is sent and the fan/blower is cut off (stopped) so that air currents do not interfere with signal transmittal, reception, accurate detection or processing. Optionally, upon detection of an occupant in an imminent, inevitable or actual intrusion into the KOZI, the fusion processing executive is bypassed and an output signal is sent to the airbag control system to immediately disable deployment of the airbag.

Equally important and as a major feature of the invention, the system of the invention has the following alternate or additional functions beyond KOZI fan modulation:

Periodically in a non-KOZI situation, the fan can be slowed or stopped momentarily for calibration of the AOS system;

The AOS history buffer in the processor circuit can check US and/or IR signals shortly after a "fan on" signal is received and compare them to most recent prior "fan off" signals as an input to recalibration;

A "fan on" signal can be sent from the fan/blower circuit to the processor section as an input in non-KOZI situations to change feature selection as sensitivity coefficients, or to change feature selection or sensitivity coefficients, or to select a special "fan on" matrix that functions whenever the fan is on, in anticipation of, or prior to, a KOZI.

That is, fan modulation and "fan on" signals to the AOS processor are not KOZI dependent.

BRIEF DESCRIPTION OF THE DRAWINGS

The invention is illustrated in the drawings in which:

FIG. 1 is a schematic block diagram of the process of the invention.

DETAILED DESCRIPTION OF THE BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 illustrates the process of the invention 1. In the normal occupant sensing operation, the IR and US sensors mounted at a selected interior position (e.g., in the headliner adjacent the windshield or side window) provide direct IR input 2 and US input 3 to the processor 4 which also combines IR and US inputs 5. The processor 4, by sensor fusion 44, evaluates signals, extracts signal features, combines selected signal features to obtain fused features, associates the signal features and fused features with a predetermined, vehicle-specific set of confidence values and empirical relationships related to known occupancy scenarios to determine a feature state value, and generates a state signal 6 depending on the occupancy state. The signal can include generating an airbag enable or do not disable (continue original state) 46. The sensor fusion algorithm 44 can also generate a deactivate signal 7 if the current state value is one of a subset of state values for which the passive restraint deployment system 8 is to be deactivated 7 or controlled 9, e.g., in a smart airbag system. Additionally, a signal 50 can be generated as a function of sensor fusion 44 to modulate the fan operation, e.g. turning off the fan periodically.

In the "normal" operating state, the US is cycled to ping and receive at its normal ping rate (NPR) 10 at the rate of about 2x/sec. If, however, there is detected 12 by return signal amplitude and/or other feature that the occupant is moving toward the KOZ, then the ping cycle rate is increased 14 to every 10–20 milliseconds (50–100 Hz). Likewise, if a crash imminent (CI) signal 16 is received from any pre-crash sensing device such as: brake pressure, travel or ABS braking system intervention; airbag deployment accelerometer sensors (ADS); collision radar; or vehicle stability control system; or if other occupant sensors (OS) derived KOZI signal(s) 18 is/are received, the ping rate 14 is likewise increased.

This fast rate US return signal is monitored for an actual 20 or imminent 22 incursion into the KOZ. If there is none, then the system returns to normal ping rate 24. If, however, the KOZI analysis is yes, then KOZI signal 26 is generated, bypassing the fusion processing 44 and its attendant state decision determination 6 as a disable signal 7 to the passive restraint system 8.

It should be understood that the bypass KOZI signal 26 can be an input 28 to modulate 45 the passive restraint deployment system 8, e.g., in the case of a smart airbag system, where the airbag is dual or multi-phase (phased inflation), slow inflation, partial inflation, inflate/deflate or the like, such that a controlled inflation (CIFL) signal 9 triggers the PRDS 8 to inflate in a predetermined controlled manner. The increase in ping cycle rate and signal selection implementation is conventional, given the description herein.

Regardless of whether the ping rate fast mode system is used or not, a KOZI signal from the fast mode system 26 or direct 80 from other pre-crash sensing device 16, 18 is used to form an interrupt signal to the fan/blower cutoff or airflow diverter system 85 of this invention. In the presently preferred best mode embodiment, the signal can be amplified by power amplification means 76 to provide power to solenoid 77 which opens switch 72 to cut off power from source 73 to fan or blower motor 74. In the alternative, the fan louvers can be closed or the air stream diverted. In another embodiment the fan can be reversed to exhaust to the exterior, to reduce interior pressure (which is normally increased when an airbag is deployed) and to clear the interior of any airbag deployment charge gasses. In either event, the air currents 75 are reduced or eliminated so that interference with the US and/or IR sensors 78 is eliminated.

In another non-KOZI-dependent embodiment a "fan on" signal can be generated or the fan activity detected (e.g. by an air vane switch), which signal is input to the sensor fusion algorithm 44. When the fan is detected as "on" this signal can effect or initiate a change in feature selection, change in sensitivity coefficients, or selection of a special "fan on" matrix.

Conversely, the processor output signals 6 can include a signal 50 to the fan circuitry 70, 76, 77 to cut off the fan or modulate its rate so that US or IR sensor 78 can take a calibration or to reduce fan interference or transients.

The same principles apply to air currents from open windows, doors or moon roofs, causing interference or transients in the received sensor signals. A conventional position sensor, or power circuit detection sensor (e.g., see A in the FIGURE) as used for the fan, can be used in the circuits of the window or moon roof, or in association with a door latch. When these are detected open, see B in FIG. 1, the signal is provided to the sensor fusion algorithm to modulate the processing, such as "change features selected," or "change sensitivity coefficients," or switch to a special matrix or set of matrixes of confidence factors or weights reflective of the degree of openness of one or more windows, moon roof, and/or doors. In addition, vehicle speed C can be a similar input. Thus, a fast moving vehicle with a window open can create a greater air flow and thus necessitate different compensating factors.

The processor can be employed to output a signal 55 to close the window or moon roof, or to report on fan speed or temperature. That is, by comparison of calibration values for a known set of temperatures stored in the history buffer, a change of temperature in the air stream, or in the overall interior, can be detected by the sensors, principally the IR sensor and output to a display 56. Similarly, the state of the PRDS can be displayed 57, e.g., on the instrument panel, or announced by use of a synthesized voice chip.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A method of airbag deployment control in an automotive occupancy sensor system which provides a processed signal to a passive restraint deployment system, which automotive occupancy sensor system has a plurality of sensors of which at least one is an ultrasound sensor, comprising the steps of:
   (a) detecting an imminent or actual Keep Out Zone incursion; and
   (b) providing a signal to a fan or blower power control means in response to said detected KOZI signal to modulate the operation of said fan or blower.

2. A method as in claim 1 wherein said KOZI signal detection includes sensing with an AOS system sensor.

3. A method as in claim 1 which includes the step of modulating includes cutting off fan or blower power in response to said interrupt signal.

4. A method of vehicle interior fan or blower control comprising the steps of:
   (a) monitoring at least a portion of the interior occupant space of said vehicle with at least one sensor and generating at least one state signal;
   (b) modulating said fan or blower power in response to said at least one signal.

5. A method as in claim 4 wherein said modulation includes cutting off or reducing fan or blower power to reduce interference or transients in signals received by said sensor.

6. A method as in claim 5 wherein said state signal is generated by a processor employing sensor fusion, and said fan modulation assists in calibration of said sensors or selection of values for a decision probability matrix.

7. A method of operation of an automotive occupant sensor system mounted in association with an automotive interior employing at least one sensor for receiving signals relating to the nature, location, or state of occupancy of at least a portion of said interior, comprising the steps of:

(a) detecting when a fan or blower associated with air flow in association with said interior is on and/or off; and (b) modulating operation of said sensor to adjust for interference or transients created in said signals by air flow created by said fan or blower.

8. A method of operation of an automotive occupant sensor system mounted in association with an automotive interior employing at least one sensor for providing to a processor signals relating to the nature, location or occupancy of at least a portion of said interior, comprising the steps of:

(a) detecting when a window, door or moon roof is open and/or closed; and (b) modulating the operation of said processor with respect to said sensor signals to account for interference or transients created in said signals by air flow created when said window, door or moon roof is opened.

* * * * *